United States Patent
Wang et al.

(10) Patent No.: US 11,474,815 B2
(45) Date of Patent: Oct. 18, 2022

(54) FPGA DYNAMIC RECONFIGURATION METHOD, APPARATUS, DEVICE AND READABLE STORAGE MEDIUM

(71) Applicant: INSPUR SUZHOU INTELLIGENT TECHNOLOGY CO., LTD., Jiangsu (CN)

(72) Inventors: Yuanli Wang, Jiangsu (CN); Guoqiang Mei, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/639,057

(22) PCT Filed: Nov. 28, 2019

(86) PCT No.: PCT/CN2019/121580
§ 371 (c)(1),
(2) Date: Feb. 28, 2022

(87) PCT Pub. No.: WO2021/042597
PCT Pub. Date: Mar. 11, 2021

(65) Prior Publication Data
US 2022/0269501 A1    Aug. 25, 2022

(30) Foreign Application Priority Data
Sep. 3, 2019   (CN) .......................... 201910827664.8

(51) Int. Cl.
*G06F 11/20*     (2006.01)
*G06F 15/80*     (2006.01)
(Continued)

(52) U.S. Cl.
CPC ................. *G06F 8/71* (2013.01); *G06F 1/08* (2013.01); *G06F 8/41* (2013.01); *G06F 15/7871* (2013.01)

(58) Field of Classification Search
CPC ..... G06F 8/71; G06F 8/41; G06F 1/08; G06F 15/7871; G06F 15/7867; G06F 15/17343
See application file for complete search history.

(56) References Cited

U.S. PATENT DOCUMENTS 7,640,527 B1   12/2009   Dorairaj et al.
7,902,866 B1   3/2011    Patterson et al.
(Continued)

FOREIGN PATENT DOCUMENTS

CN   103677916 A   3/2014
CN   103685890 A   3/2014
(Continued)

OTHER PUBLICATIONS

Ron L. Moon, Migration of a real-time optimal-control algorithm from MATLAB TM to Field Programmable Gate Array (FPGA), 2005, [Retrieved on Jul. 12, 2022], Retrieved from the internet: <URL: https://core.ac.uk/download/pdf/36695503.pdf> 114 Pages (1-114) (Year: 2005).*
(Continued)

*Primary Examiner* — Anibal Rivera
(74) *Attorney, Agent, or Firm* — Cooper Legal Group LLC

(57) ABSTRACT

A field programmable gate array (FPGA) dynamic reconfiguration method, apparatus, device and readable storage medium are provided. The technical solution includes: performing board support package (BSP) flat compilation on a target project to obtain a static region; performing BSP generation and reconfiguration information compilation on the target project to obtain static information; revising the
(Continued)

static region using the static information to obtain reconfiguration compilation version projects that meet timing and correspond to different reconfiguration compilation parameters, respectively; importing a preset heterogeneous acceleration kernel to the reconfiguration compilation version projects and then performing static compilation to obtain clock frequencies corresponding to the reconfiguration compilation version projects, respectively; and determining a target reconfiguration compilation version project with a clock frequency meeting performance requirements using the clock frequencies, and obtaining a dynamic reconfiguration compilation version project file. The dynamic reconfiguration compilation version project file obtained in this technical solution ensures that the static region can meet the timing, and also enables an operating clock of the heterogeneous acceleration kernel to meet the performance requirements for heterogeneous acceleration.

19 Claims, 4 Drawing Sheets

(51) Int. Cl.
*G06F 15/78* (2006.01)
*G06F 8/71* (2018.01)
*G06F 1/08* (2006.01)
*G06F 8/41* (2018.01)

(56) References Cited

U.S. PATENT DOCUMENTS 9,037,807 B2 * 5/2015 Vorbach .............. G06F 13/1663
711/147

2003/0163798 A1 * 8/2003 Hwang ................... G06F 30/34
716/102
2020/0320776 A1 * 10/2020 Doyle ..................... G06T 9/001

FOREIGN PATENT DOCUMENTS

| CN | 104133692 A | 11/2014 |
|---|---|---|
| CN | 104219121 A | 12/2014 |
| CN | 106027510 A | 10/2016 |
| CN | 108776649 A | 11/2018 |
| CN | 108804232 A | 11/2018 |
| CN | 109344115 A | 2/2019 |

OTHER PUBLICATIONS

C. Desmouliers et al., Discrete wavelet transform realisation using run-time reconfiguration of field programmable gate array (FPGA)s, 2011, [Retrieved on Jul. 12, 2022], Retrieved from the internet: <URL: http://www.ece.iit.edu/~/eoruklu/IIT/Publications_files/05963762.pdf> 8 Pages (321-328) (Year: 2011).*

Han Lianbing, et al. "The Realization and Application of FPGA Partial Reconfiguration Technology." Communication Technology 49.12, Dec. 2016, vol. 49 No.12, 1728-1732.

Santambrogio, Marco D., and Donatella Sciuto. "Design methodology for partial dynamic reconfiguration: a new degree of freedom in the HW/SW codesign." 2008 IEEE International Symposium on Parallel and Distributed Processing. IEEE, 2008, 8 pages.

Notification to Grant Patent Right for Invention of CN201910827664.8, dated Dec. 14, 2020, 3 pages.

International Search Report and English Translation as cited in PCT/CN2019/121580, dated Jun. 4, 2020, 5 pages.

Written Opinion and English Translation as cited in PCT/CN2019/121580, dated Jun. 4, 2020, 7 pages.

First Office Action and English Translation cited in CN201910827664.8, dated May 22, 2020, 7 pages.

* cited by examiner

US 11,474,815 B2

FPGA DYNAMIC RECONFIGURATION METHOD, APPARATUS, DEVICE AND READABLE STORAGE MEDIUM

CROSS-REFERENCE TO RELATED APPLICATIONS

The present application claims priority to Chinese Patent Application No. 201910827664.8, filed to the China Patent Office on Sep. 3, 2019, entitled "FPGA Dynamic Reconfiguration Method, Apparatus, Device and Readable Storage Medium", the contents of which are hereby incorporated by reference in its entirety.

TECHNICAL FIELD

The present invention relates to the technical field of heterogeneous acceleration, and in particular, to a Field Programmable Gate Array (FPGA) dynamic reconfiguration method, apparatus, device and readable storage medium.

BACKGROUND ART

As a very useful design method in logic design, FPGA dynamic reconfiguration may dynamically reprogram an FPGA at run-time and change functions thereof online, greatly save resources in an FPGA chip, and reserve more space for other work. When the FPGA chip is running, dedicated logic runtime functions of the FPGA chip can be dynamically switched by loading a reconfiguration file. This rapid reconfiguration method only requires loading a small-size partial configuration file, without loading the complete configuration file, resulting in a high loading speed. This characteristic not only realizes the time-division multiplexing of the FPGA chip, but also increases the real-time performance and flexibility of a heterogeneous acceleration platform.

At present, in the general FPGA development process, the partial reconfiguration method is a module-based PR (partial reconfiguration), which allows the reconfiguration of specific module elements in the design. In order to ensure communication across boundaries of reconfigurable modules, a special bus macro-cell needs to be prepared in advance. The bus macro-cell works as a fixed routing bridge, and is connected to the reconfigurable modules in the spare part of the design. The module-based PR requires running a specific set of guidelines during the design specification stage. Finally, a discrete bit stream is created for each reconfigurable module in the design. Such bit streams may be used to run PR.

That is, a region that needs to be partially reconfigured is divided by dividing the boundaries of each FPGA module. A static region part does not need to be reloaded and has a fixed function, and the part that needs to be reloaded is only the dynamic region.

The above dynamic reconfiguration implementation method is used in a common FPGA development platform, the division of the static and dynamic regions is only defined at the module level, and the static and dynamic regions of the FPGA are divided according to module function boundary requirements. A hardware FPGA part of the heterogeneous acceleration platform includes not only a basic logic function, but also an open computing language (OpenCL) heterogeneous acceleration kernel part. The implementation using a traditional FPGA PR method will substantially reduce the running frequency of the kernel, and the performance thereof cannot meet the requirements.

In summary, how to effectively solve the problems of FPGA dynamic reconfiguration, etc., is an urgent technical problem to be solved for those skilled in the art at present.

SUMMARY OF THE INVENTION

An object of the present invention is to provide an FPGA dynamic reconfiguration method, apparatus, device and readable storage medium, so as to avoid the problem of reducing the running frequency of a kernel after FPGA dynamic reconfiguration, and to meet performance requirements for heterogeneous acceleration after dynamic reconfiguration.

In order to solve the above technical problem, the present invention provides the following technical solutions:

An FPGA dynamic reconfiguration method includes:
performing board support package (BSP) flat compilation on a target project to obtain a static region on an FPGA chip corresponding to the target project;
performing BSP generation and reconfiguration information compilation on the target project to obtain static information;
revising the static region using the static information to obtain reconfiguration compilation version projects that meet timing and correspond to different reconfiguration compilation parameters, respectively;
importing a preset heterogeneous acceleration kernel into the reconfiguration compilation version projects and then performing static compilation to obtain clock frequencies corresponding to the reconfiguration compilation version projects respectively; and
determining a target reconfiguration compilation version project with a clock frequency that meets performance requirements using the clock frequencies, and obtaining a dynamic reconfiguration compilation version project file using the target reconfiguration compilation version project.

Preferably, the performing BSP flat compilation on the target project to obtain a static region on the FPGA chip corresponding to the target project includes:
performing BSP flat compilation on the target project under different flat compilation parameters to obtain spatial position information of layout and routing of interface Intellectual Property (IP) corresponding to the different flat compilation parameters respectively on the FPGA chip; and
determining the static region using the spatial position information according to static region division rules.

Preferably, the performing BSP generation and reconfiguration information compilation on the target project to obtain static information includes:
performing BSP generation and reconfiguration information compilation on the target project under the different reconfiguration compilation parameters to obtain original reconfiguration compilation version projects corresponding to the different reconfiguration compilation parameters respectively; and
acquiring a critical path from the plurality of original reconfiguration compilation version projects, and using the critical path as the static information.

Preferably, the revising the static region using the static information to obtain reconfiguration compilation version projects that meet timing and correspond to different reconfiguration compilation parameters respectively includes:
correcting timing violations corresponding to the original reconfiguration compilation version projects, and revising the static region using critical information to obtain the plurality of reconfiguration compilation version projects.

Preferably, the importing a preset heterogeneous acceleration kernel into the reconfiguration compilation version projects and then performing static compilation to obtain clock frequencies corresponding to the reconfiguration compilation version projects, respectively, includes:

sequentially importing the preset heterogeneous acceleration kernel to each of the reconfiguration compilation version projects and then performing static compilation to obtain the clock frequencies corresponding to each of the reconfiguration compilation version projects respectively after being imported with different preset heterogeneous acceleration kernels.

Preferably, the determining a target reconfiguration compilation version project using the clock frequencies and obtaining a dynamic reconfiguration compilation version project file using the target reconfiguration compilation version project includes:

calculating, using the clock frequencies, average clock frequencies corresponding to each of the reconfiguration compilation version projects after being imported with different preset heterogeneous acceleration kernels;

determining the reconfiguration compilation version project corresponding to the maximum average clock frequency as the target reconfiguration compilation version project; and acquiring the dynamic reconfiguration compilation version project file generated by the target reconfiguration compilation version project corresponding to the maximum clock frequency.

Preferably, after obtaining a dynamic reconfiguration compilation version project file using the target reconfiguration compilation version project, the method includes:

dynamically reconfiguring the heterogeneous acceleration kernel in the FPGA chip on the basis of the dynamic reconfiguration compilation version project file.

An FPGA dynamic reconfiguration apparatus includes:

a static region determining module, configured to perform board support package (BSP) flat compilation on a target project to obtain a static region on an FPGA chip corresponding to the target project;

a static information acquiring module, configured to perform BSP generation and reconfiguration information compilation on the target project to obtain static information;

a reconfiguration compilation version project acquiring module, configured to revise the static region using the static information to obtain reconfiguration compilation version projects that meet timing and correspond to different reconfiguration compilation parameters respectively;

a clock frequency acquiring module, configured to import a preset heterogeneous acceleration kernel to the reconfiguration compilation version projects and then perform static compilation to obtain clock frequencies corresponding to the reconfiguration compilation version projects respectively; and a dynamic reconfiguration compilation version project file acquiring module, configured to determine a target reconfiguration compilation version project with a clock frequency that meets performance requirements using the clock frequencies, and obtain a dynamic reconfiguration compilation version project file using the target reconfiguration compilation version project.

An FPGA dynamic reconfiguration device includes:

a memory configured to store a computer program; and a processor configured to implement, when executing the computer program, the steps of the above FPGA dynamic reconfiguration methods.

A readable storage medium has stored thereon a computer program which, when executed by a processor, implements the steps of the above FPGA dynamic reconfiguration methods.

In this method, it is considered that a hardware FPGA part of the heterogeneous acceleration platform includes not only a basic logic function, but also an OpenCL heterogeneous acceleration kernel part. Therefore, when dividing the static region and the dynamic region, the static and dynamic regions of an FPGA cannot be divided simply according to module function boundary requirements. Therefore, this method proposes that a static region may be obtained by performing a BSP flat compilation on a target project, since the BSP flat compilation may determine layout and routing positions of main interface IPs on the FPGA chip.

In order to ensure the division accuracy of the static region and meet timing requirements, BSP generation and reconfiguration information compilation is also performed on the target project to obtain static information. Then, the static region may be revised based on the static information, and timing violation processing may be performed to obtain different reconfiguration compilation version projects that meet timing and correspond to different reconfiguration compilation parameters, respectively. Then, clock frequencies may be obtained by importing a preset heterogeneous acceleration kernel to the reconfiguration compilation version projects and performing static compilation. A target reconfiguration compilation version project with a clock frequency that meets performance requirements for heterogeneous acceleration and a dynamic reconfiguration compilation version project file corresponding to the target reconfiguration compilation version project may be finally selected based on the clock frequencies. The dynamic reconfiguration compilation version project file divides the dynamic region and the static region accurately, the static region meets timing, and the clock frequency of the heterogeneous acceleration kernel in the dynamic region can meet the performance requirements for heterogeneous acceleration. It can be seen that the dynamic reconfiguration compilation version project file obtained in this method ensures that the static region can meet the timing, and also enables an operating clock of the heterogeneous acceleration kernel to meet the performance requirements for heterogeneous acceleration.

Accordingly, embodiments of the present invention also provide an FPGA dynamic reconfiguration apparatus and device and a readable storage medium corresponding to the above FPGA dynamic reconfiguration method, which have the above technical effects and will not be described in detail herein again.

BRIEF DESCRIPTION OF THE DRAWINGS

In order to more clearly illustrate the technical solutions in the embodiments of the present invention or the prior art, the drawings needing to be used in the description of the embodiments or the prior art will be briefly introduced below. It is obvious that the drawings in the following description are merely some embodiments of the present invention, and a person of ordinary skill in the art may also obtain other drawings according to these drawings without involving any inventive effort.

DETAILED DESCRIPTION OF THE INVENTION

In order to enable those skilled in the art to better understand the solution of the present invention, the present invention will be further described in detail below with reference to the accompanying drawings and specific embodiments. Apparently, the described embodiments are only a part of the embodiments of the present invention, rather than all the embodiments. Based on the embodiments of the present invention, all other embodiments obtained by those skilled in the art without creative work shall fall within the projection scope of the present invention.

Embodiment 1

Figure 1:
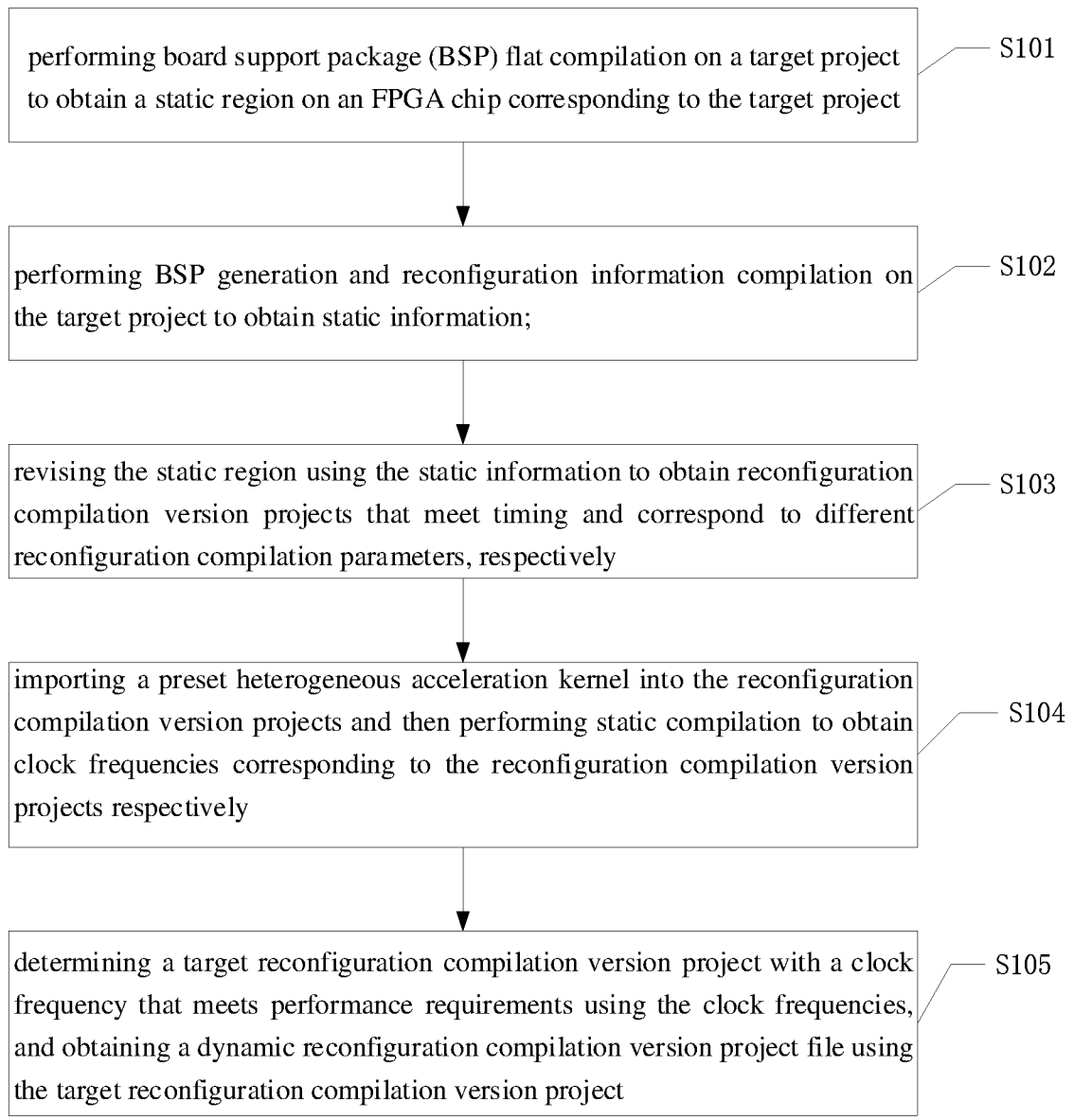
FIG. 1 is an implementation flow chart of an FPGA dynamic reconfiguration method in an embodiment of the present invention.

Refer to FIG. 1, which is an implementation flow chart of an FPGA dynamic reconfiguration method in an embodiment of the present invention. The method can be applied to a computer device corresponding to a heterogeneous acceleration platform. The method includes the following steps:

At S101, board support package (BSP) flat compilation is performed on a target project to obtain a static region on an FPGA chip corresponding to the target project.

The target project is a heterogeneous acceleration project that needs to be carried on the FPGA chip and executed, such as image processing, big data analysis, artificial intelligence, and other data acceleration processing tasks/projects.

The BSP is a layer between motherboard hardware and operating system and may also be considered as a part of the operating system. The main purpose of the BSP is to support the operating system, so that it can run better on the hardware motherboard. BSP flat compilation is: compiling a target process for better running on the FPGA chip. That is, a flat compilation mode (a compilation mode capable of achieving this compilation effect, provided by existing development software) is executed on the target project, so that a static region on the FPGA chip corresponding to the target project can be obtained.

The static region refers to a region that does not need to be changed in a dynamic reconfiguration process.

Preferably, in order to improve the division accuracy of the static region, the target project may be compiled several times in a flat compilation mode with different flat compilation parameters. The specific implementation process includes the following steps.

In step one, BSP flat compilation is performed on the target project under different flat compilation parameters to obtain spatial position information of layout and routing of interface Intellectual Property (IP) corresponding to the different flat compilation parameters, respectively, on the FPGA chip;

In step two, the static region is determined using the spatial position information according to the static region division rules.

For convenience of description, the above two steps are described below in combination.

The flat compilation parameter is a compilation parameter corresponding to the flat compilation mode, i.e. a seed. Under different seeds, the target project is compiled in the flat compilation mode to determine placement of main interface IPs (e.g., PCIE and DDR4 controllers, etc.) on the layout and routing of the FPGA chip. The reason for compiling different seeds is that, on the one hand, whether there is a critical path timing problem may be checked, and if there is a timing problem, the problem may be removed to ensure that the project timing is met; on the other hand, it is possible to determine an arrangement position of a basic underlying logical framework of a board during layout and routing. The static region finally determined should also specifically meet the following static region division rules:

(1) Whether to include a DSP (Digital Signal Processing Unit internal to the FPGA) resources in the static area, it is necessary to distribute all DSP resources to the kernel (heterogeneous acceleration kernel) part, that is, the partial reconfiguration part;

(2) Dividing the static region requires a degree of resource margin, otherwise it will cause timing congestion in the static part, resulting in unsatisfactory timing and poor performance in the board part;

(3) The division of concave surfaces to the static region part is minimized.

After the static region is determined, the operation of step S102 can be performed.

At S102, BSP generation and reconfiguration information compilation is performed on the target project to obtain static information.

The BSP generation and reconfiguration information compilation may specifically be a base compilation mode (a compilation mode capable of achieving this compilation effect, provided by existing development software), and for the convenience of description, the reconfiguration compilation version project is hereinafter referred to as a base version project. That is, the base compilation mode may be performed to compile the target project. Specifically, performing BSP generation and reconfiguration information compilation on the target project may be performing base compilation on the BSP obtained by compilation in step S101.

The static information is information related to the division of the static region, for example, critical path information.

Preferably, in order to obtain more accurate static information, the target project may be compiled under different compilation parameters. The specific implementation process thereof includes the following steps.

In step one, BSP generation and reconfiguration information compilation is performed on the target project under the different reconfiguration compilation parameters to obtain original reconfiguration compilation version projects corresponding to the different reconfiguration compilation parameters, respectively;

In step two, a critical path is acquired from the plurality of original reconfiguration compilation version projects, and using the critical path as the static information.

For the convenience of description, the above two steps are described below in combination.

The reconfiguration compilation parameters are different seeds of the base compilation mode. That is, after performing the above two steps, the result of compiling the target project in the base compilation mode under different speeds, i.e. original reconfiguration compilation version projects, may be obtained. A critical path may be acquired from the plurality of original reconfiguration compilation version projects. For example, a path owned by the plurality of original reconfiguration compilation version projects may be regarded as a critical path, which may correct a static path. Therefore, the critical path may be used as the static information.

At S103, the static region is revised using the static information to obtain reconfiguration compilation version projects that meet timing and correspond to different reconfiguration compilation parameters respectively.

After obtaining the static information, whether the static region matches the static information may be compared, and if not, the static region information is revised so that the static region matches the static information. After the static region, a timing violation may be processed, and finally, reconfiguration compilation version projects corresponding to different seeds may be obtained.

That is, obtaining reconfiguration compilation version projects that meet timing and correspond to different reconfiguration compilation parameters respectively specifically is: correcting timing violations corresponding to the original reconfiguration compilation version projects, and revising the static region using critical information to obtain the plurality of reconfiguration compilation version projects. The reason for compiling a plurality of versions of projects under different seeds is to find the critical path, thereby solving the problem of timing violations every time. The static region is redivided, and the iteration is performed in this way until the timing is not violated.

At S104, a preset heterogeneous acceleration kernel is imported to the reconfiguration compilation version projects and then static compilation is performed to obtain clock frequencies corresponding to the reconfiguration compilation version projects respectively.

The heterogeneous acceleration kernel is heterogeneous acceleration logic. Specifically, the heterogeneous acceleration kernel may be presented in code. The specific logic of the preset heterogeneous acceleration kernel is not limited in the embodiment of the present invention.

The static compilation may specifically be analog compilation after importing the heterogeneous acceleration kernel. The static compilation may specifically be base mode compilation (a compilation mode capable of achieving this compilation effect, provided by existing development software), so as to obtain the clock frequency of the heterogeneous acceleration kernel after importing the heterogeneous acceleration kernel into the reconfiguration compilation version project. That is, the clock frequencies referred to herein are heterogeneous acceleration clock frequencies that are imported into the reconfiguration compilation version projects.

Preferably, in order to verify the reliability of each reconfiguration compilation version project and avoid the occurrence of contingency, different heterogeneous acceleration kernels may also be imported into the reconfiguration compilation version projects, and the corresponding compilation parameters may also be adjusted when compiling. The specific implementation thereof may be: sequentially importing the preset heterogeneous acceleration kernel to each of the reconfiguration compilation version projects and then performing static compilation to obtain the clock frequencies corresponding to each of the reconfiguration compilation version projects respectively after being imported with different preset heterogeneous acceleration kernels. For example, when the reconfiguration compilation project includes A1, A2, A3 and A4, and the preset heterogeneous acceleration kernel includes B1, B3 and B3, and the seed includes S1 and S2, the obtained clock frequencies are corresponding clock frequencies after importing B1, B3 and B3 into A1, A2, A3 and A4 respectively and sequentially compiling under S1 and S2, i.e. the total number of clock frequencies is 4*3*2=24. It should be noted that the specific number of reconfiguration compilation version projects, heterogeneous acceleration kernels, and seeds is not limited in the embodiment of the present invention.

At S105, a target reconfiguration compilation version project with a clock frequency that meets performance requirements is determined using the clock frequencies, and a dynamic reconfiguration compilation version project file is obtained using the target reconfiguration compilation version project.

After obtaining a plurality of clock frequencies, the clock frequencies may be used as filtering parameters to determine a target reconfiguration compilation version project with a clock frequency that meets performance requirements. Then, a dynamic reconfiguration compilation version project file is obtained based on the target reconfiguration compilation version project.

The determination of a target reconfiguration compilation version project with a clock frequency that meets performance requirements may specifically be: setting a clock frequency threshold required to meet the heterogeneous acceleration performance for the heterogeneous acceleration kernel, and selecting a carrier reconfiguration compilation version project of the heterogeneous acceleration kernel that is greater than the clock frequency threshold from the plurality of clock frequencies.

Preferably, considering that the reconfiguration compilation version project needs to achieve performance requirements after importing a certain heterogeneous acceleration kernel upon dynamic reloading, the clock frequencies corresponding to a plurality of heterogeneous acceleration kernels imported sequentially may be comprehensively considered when selecting and determining the target reconfiguration compilation version project, so as to avoid the occurrence of contingency. The specific implementation process thereof includes the following steps.

In step one, average clock frequencies corresponding to each of the reconfiguration compilation version projects after being imported with the different preset heterogeneous acceleration kernels are calculated using the clock frequencies.

In step two, the reconfiguration compilation version project corresponding to the maximum average clock frequency is determined as the target reconfiguration compilation version project.

In step three, the dynamic reconfiguration compilation version project file generated by the target reconfiguration compilation version project corresponding to the maximum clock frequency is acquired.

For convenience of description, the above three steps are described below in combination.

Import mode compilation is performed on each base version project using files of different kernels, an average clock frequency of the kernel of each base version project is acquired, and the base version project obtaining the highest clock frequency of the kernel is selected as the target reconfiguration compilation version project. Then, a base.qar file (i.e. a dynamic reconfiguration compilation version project file) generated by the base version project with the highest clock frequency of the kernel is obtained, and the file contains relevant contents of the layout and routing and timing of the static region (board).

After obtaining a dynamic reconfiguration compilation version project file using the target reconfiguration compilation version project, the heterogeneous acceleration kernel in the FPGA chip is dynamically reconfigured on the basis of the dynamic reconfiguration compilation version project file. Then, only the development of an algorithm part kernel is needed, and all the projects developed may be compiled on this basis. How to perform dynamic reconfiguration subsequently may be described specifically with reference to the existing dynamic reconfiguration process, which will not be described in detail herein again.

The method provided in the embodiment of the present invention is applied. In this method, it is considered that a hardware FPGA part of the heterogeneous acceleration platform includes not only a basic logic function, but also an OpenCL heterogeneous acceleration kernel part. Therefore, when dividing the static region and the dynamic region, the static and dynamic regions of an FPGA cannot be divided simply according to module function boundary requirements. Therefore, this method proposes that a static region may be obtained by performing BSP flat compilation on a target project since the BSP flat compilation may determine layout and routing positions of main interface IPs on the FPGA chip.

In order to ensure the division accuracy of the static region and meet timing requirements, BSP generation and reconfiguration information compilation is also performed on the target project to obtain static information. Then, the static region may be revised based on the static information, and timing violation processing may be performed to obtain different reconfiguration compilation version projects that meet timing and correspond to different reconfiguration compilation parameters respectively. Then, clock frequencies may be obtained by importing a preset heterogeneous acceleration kernel to the reconfiguration compilation version projects and performing static compilation. A target reconfiguration compilation version project with a clock frequency that meets performance requirements for heterogeneous acceleration and a dynamic reconfiguration compilation version project file corresponding to the target reconfiguration compilation version project may be finally selected based on the clock frequencies. The dynamic reconfiguration compilation version project file divides the dynamic region and the static region accurately, the static region meets timing, and the clock frequency of the heterogeneous acceleration kernel in the dynamic region can meet the performance requirements for heterogeneous acceleration. It can be seen that the dynamic reconfiguration compilation version project file obtained in this method ensures that the static region can meet the timing, and also enables an operating clock of the heterogeneous acceleration kernel to meet the performance requirements for heterogeneous acceleration.

In order to facilitate those skilled in the art to better implement the FPGA dynamic reconfiguration method provided by the embodiments of the present invention, the FPGA dynamic reconfiguration method provided by the embodiments of the present invention is described in detail below by taking a specific application scenario as an example.

Figure 2:
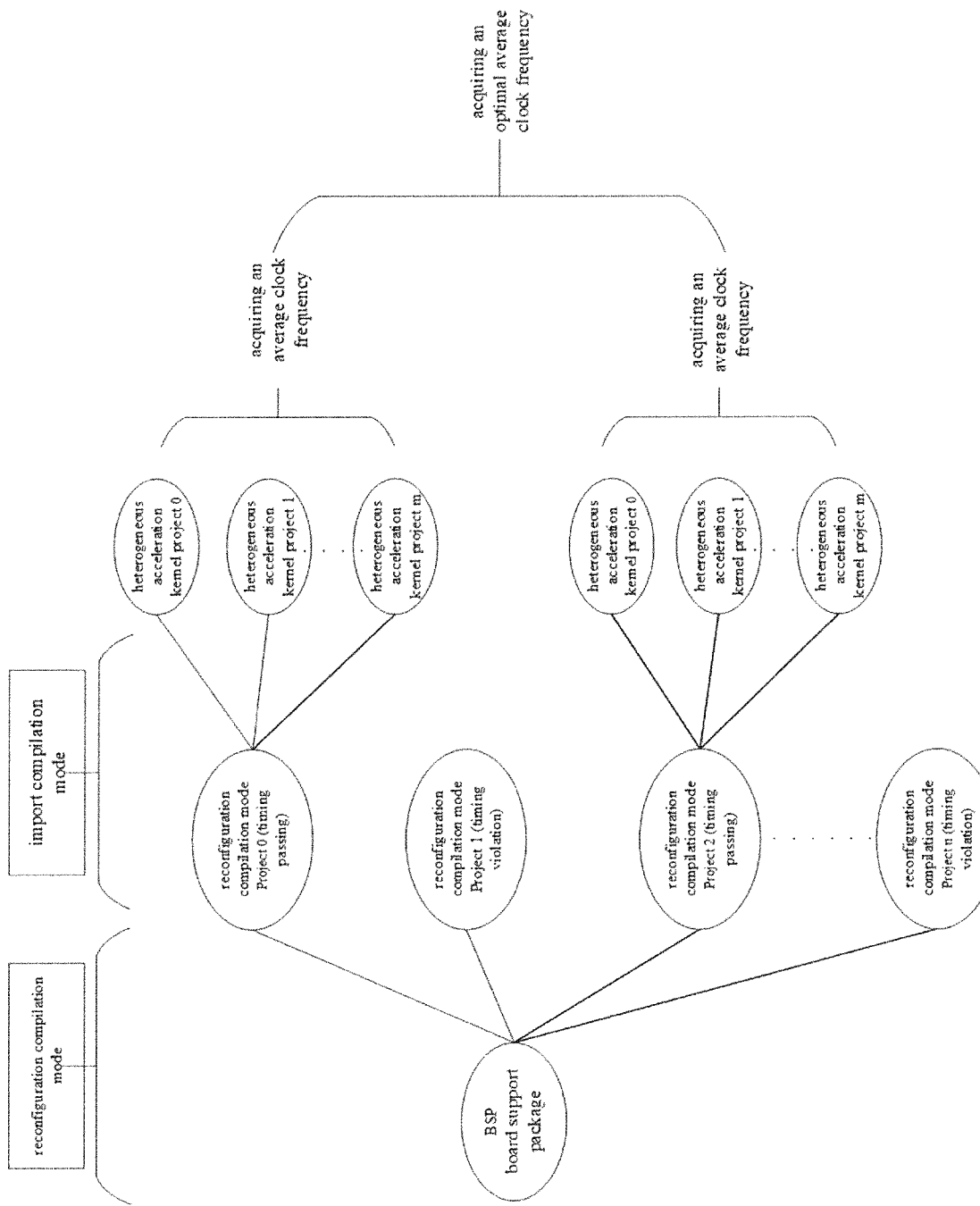
FIG. 2 is a schematic specific implementation diagram of an FPGA dynamic reconfiguration method in an embodiment of the present invention.

Referring to FIG. 2, which is a schematic specific implementation diagram of an FPGA dynamic reconfiguration method in an embodiment of the present invention.

A BSP is a board support package obtained after performing flat compilation on a target project. Based on the BSP, base compilation is performed according to different seeds to obtain a plurality of base version projects. Then, different preset heterogeneous acceleration kernels (FIGS. 0, 1, . . . ,m) are imported into each base version project. An average clock frequency corresponding to each base version project is calculated, the best base version project is selected, and a base.qar file is obtained based on the base version project.

Embodiment 2

In accordance with the above method embodiment, an embodiment of the present invention also provides an FPGA dynamic reconfiguration apparatus. The FPGA dynamic reconfiguration apparatus described below and the FPGA dynamic reconfiguration method described above may refer to each other correspondingly.

Figure 3:
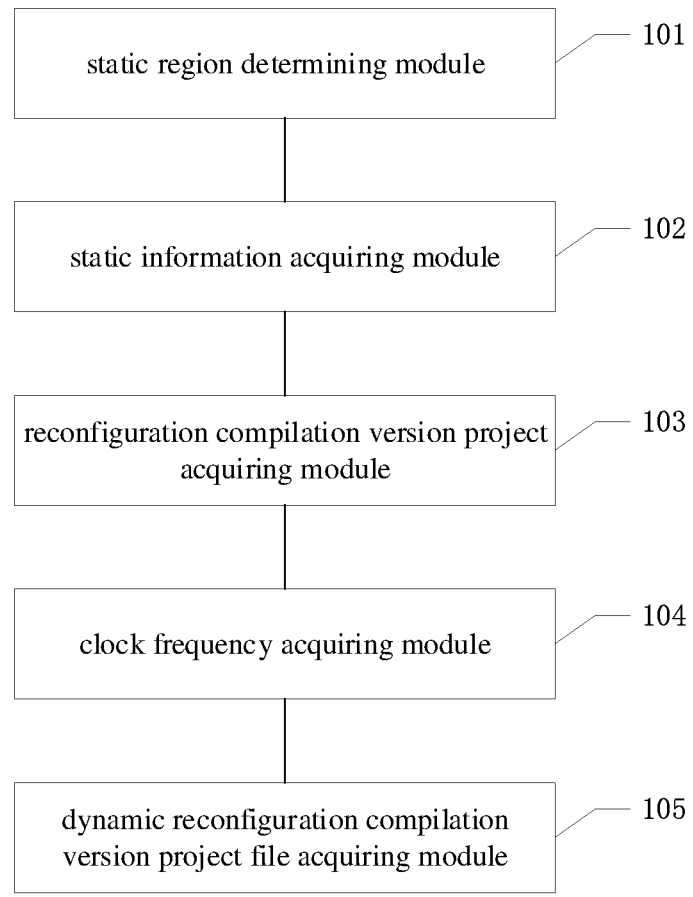
FIG. 3 is a schematic structure diagram of an FPGA dynamic reconfiguration apparatus in an embodiment of the present invention.

Referring to FIG. 3, the apparatus includes the following modules:

a static region determining module 101, configured to perform board support package (BSP) flat compilation on a target project to obtain a static region on an FPGA chip corresponding to the target project;

a static information acquiring module 102, configured to perform BSP generation and reconfiguration information compilation on the target project to obtain static information;

a reconfiguration compilation version project acquiring module 103, configured to revise the static region using the static information to obtain reconfiguration compilation version projects that meet timing and correspond to different reconfiguration compilation parameters respectively;

a clock frequency acquiring module 104, configured to import a preset heterogeneous acceleration kernel to the reconfiguration compilation version projects and then perform static compilation to obtain clock frequencies corresponding to the reconfiguration compilation version projects, respectively; and a dynamic reconfiguration compilation version project file acquiring module 105, configured to determine a target reconfiguration compilation version project with a clock frequency that meets performance requirements using the clock frequencies, and obtain a dynamic reconfiguration compilation version project file using the target reconfiguration compilation version project.

In this apparatus, it is considered that a hardware FPGA part of the heterogeneous acceleration platform includes not only a basic logic function, but also an OpenCL heterogeneous acceleration kernel part. Therefore, when dividing the static region and the dynamic region, the static and dynamic regions of an FPGA cannot be divided simply according to module function boundary requirements. Therefore, this apparatus proposes that a static region may be obtained by performing a BSP flat compilation on a target project, since the BSP flat compilation may determine layout and routing positions of main interface IPs on the FPGA chip.

In order to ensure the division accuracy of the static region and meet timing requirements, BSP generation and reconfiguration information compilation is also performed on the target project to obtain static information. Then, the static region may be revised based on the static information, and timing violation processing may be performed to obtain different reconfiguration compilation version projects that meet timing and correspond to different reconfiguration compilation parameters, respectively. Then, clock frequencies may be obtained by importing a preset heterogeneous acceleration kernel into the reconfiguration compilation version projects and performing static compilation. A target reconfiguration compilation version project with a clock frequency that meets performance requirements for heterogeneous acceleration and a dynamic reconfiguration compilation version project file corresponding to the target reconfiguration compilation version project may be finally selected based on the clock frequencies. The dynamic reconfiguration compilation version project file divides the dynamic region and the static region accurately, the static region meets timing, and the clock frequency of the heterogeneous acceleration kernel in the dynamic region can meet the performance requirements for heterogeneous acceleration. It can be seen that the dynamic reconfiguration compilation version project file obtained in this apparatus ensures that the static region can meet the timing, and also enables an operating clock of the heterogeneous acceleration kernel to meet the performance requirements for heterogeneous acceleration.

In a specific implementation of the present invention, the static region determining module 101 is specifically configured to perform BSP flat compilation on the target project under different flat compilation parameters to obtain spatial position information of layout and routing of interface IPs corresponding to the different flat compilation parameters, respectively, on the FPGA chip, and determine the static region using the spatial position information according to static region division rules.

In a specific implementation of the present invention, the static information acquiring module 102 is specifically configured to perform BSP generation and reconfiguration information compilation on the target project under the different reconfiguration compilation parameters to obtain original reconfiguration compilation version projects corresponding to the different reconfiguration compilation parameters, respectively, acquire a critical path from the plurality of original reconfiguration compilation version projects, and use the critical path as the static information.

In a specific implementation of the present invention, the reconfiguration compilation version project acquiring module 103 is specifically configured to correct timing violations corresponding to the original reconfiguration compilation version projects, and revise the static region using critical information to obtain the plurality of reconfiguration compilation version projects.

In a specific implementation of the present invention, the clock frequency acquiring module 104 is specifically configured to sequentially import a preset heterogeneous acceleration kernel to each of the reconfiguration compilation version projects and then perform static compilation to obtain the clock frequencies corresponding to each of the reconfiguration compilation version projects, respectively, after being imported with the different preset heterogeneous acceleration kernels.

In a specific implementation of the present invention, the dynamic reconfiguration compilation version project file acquiring module 105 is specifically configured to calculate, using the clock frequencies, average clock frequencies corresponding to each of the reconfiguration compilation version projects after being imported with the different preset heterogeneous acceleration kernels, determine the reconfiguration compilation version project corresponding to the maximum average clock frequency as the target reconfiguration compilation version project, and acquire the dynamic reconfiguration compilation version project file generated by the target reconfiguration compilation version project corresponding to the maximum clock frequency.

In a specific implementation of the present invention, the apparatus includes:

a dynamic reconfiguration module, configured to dynamically reconfigure, after obtaining a dynamic reconfiguration compilation version project file using the target reconfiguration compilation version project, the heterogeneous acceleration kernel in the FPGA chip on the basis of the dynamic reconfiguration compilation version project file.

Embodiment 3

In accordance with the above method embodiment, an embodiment of the present invention also provides an FPGA dynamic reconfiguration device. The FPGA dynamic reconfiguration device described below and the FPGA dynamic reconfiguration method described above may refer to each other correspondingly.

Figure 4:
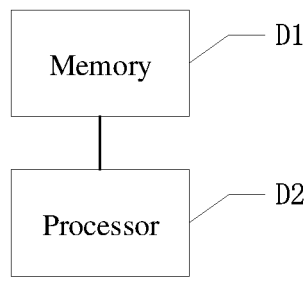
FIG. 4 is a schematic structure diagram of an FPGA dynamic reconfiguration device in an embodiment of the present invention.

Referring to FIG. 4, the FPGA dynamic reconfiguration device includes the following:

a memory D1, configured to store a computer program; and a processor D2, configured to implement, when executing the computer program, the steps of the FPGA dynamic reconfiguration method in the above method embodiment.

Figure 5:
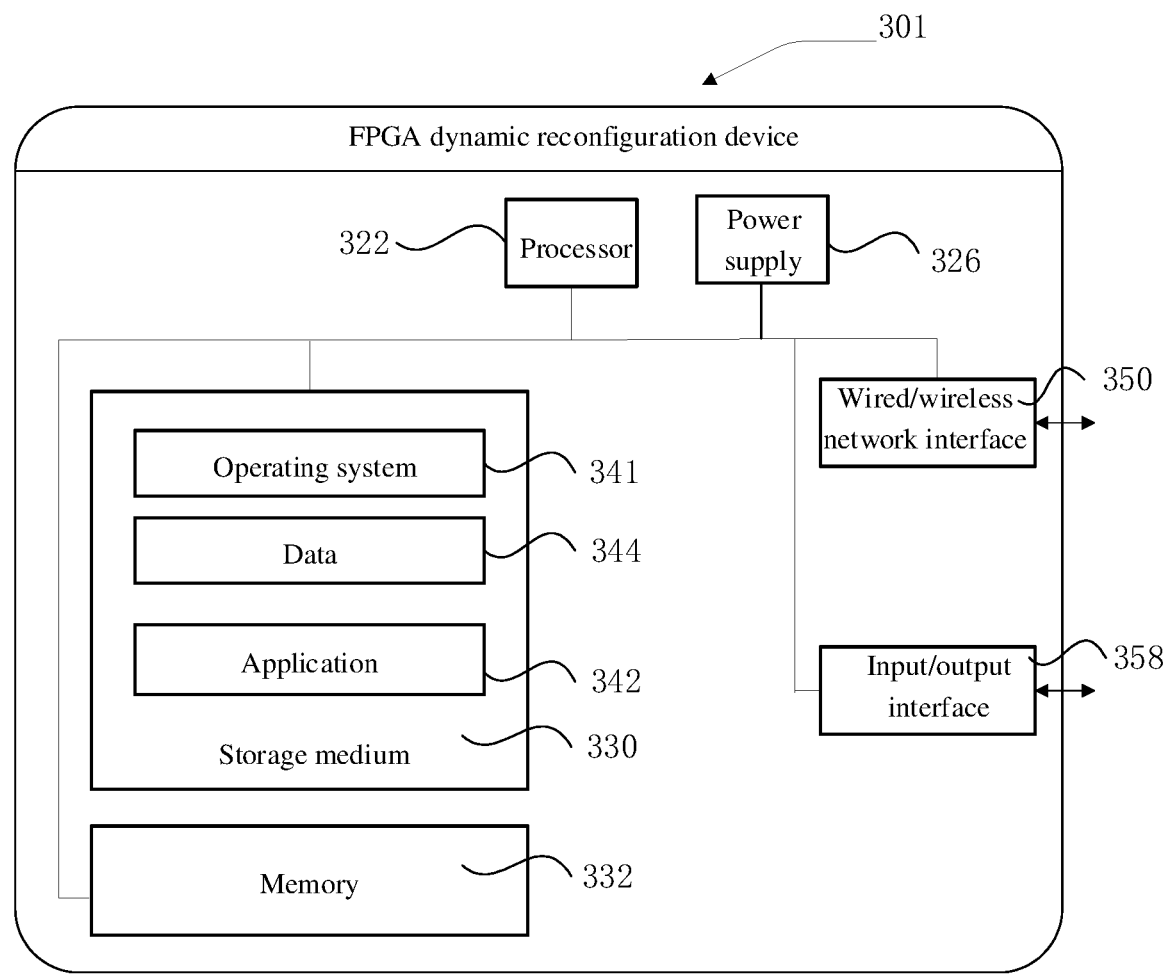
FIG. 5 is a schematic specific structure diagram of an FPGA dynamic reconfiguration device in an embodiment of the present invention.

Specifically, referring to FIG. 5, which is a schematic specific structure diagram of an FPGA dynamic reconfiguration device provided by the present embodiment. The FPGA dynamic reconfiguration device may vary widely due to different configurations or performances, and may include one or more central processing units (CPUs) 322 (e.g. one or more processors), a memory 332, and one or more storage media 330 (e.g. one or more mass storage devices) for storing applications 342 or data 344. The memory 332 and the storage medium 330 may be a transient memory or a persistent memory. A program stored on the storage medium 330 may include one or more modules (not shown), and each module may include a series of instruction operations on a data processing device. Still further, the CPU 322 may be configured to communicate with the storage medium 330 to execute a series of instruction operations within the storage medium 330 on the FPGA dynamic reconfiguration device 301.

The FPGA dynamic reconfiguration device 301 may also include one or more power supplies 326, one or more wired or wireless network interfaces 350, one or more input/output interfaces 358, and/or one or more operating systems 341. For example, the operating systems may include Windows Server™, Mac OS X™, Unix™, Linux™, FreeBSD™, etc.

The steps in the FPGA dynamic reconfiguration method described above may be implemented by the structure of the FPGA dynamic reconfiguration device.

Embodiment 4

Corresponding to the above method embodiment, an embodiment of the present invention also provides a readable storage medium. The readable storage medium described below and the FPGA dynamic reconfiguration method described above may refer to each other correspondingly.

A readable storage medium has stored thereon a computer program which, when executed by a processor, implements the steps of the FPGA dynamic reconfiguration method in the above method embodiment.

The readable storage medium may be specifically a flash drive, a removable hard disk, a read-only memory (ROM), a random access memory (RAM), a magnetic disk or an optical disk, and other readable storage media that may store program codes.

Those skilled in the art may further realize that the units and algorithmic steps of each example described in conjunction with the embodiments disclosed herein are capable of being implemented in electronic hardware, computer software, or a combination of both, and that the composition and steps of each example have been described generally by function in the above description for the purpose of clearly illustrating the interchangeability of hardware and software. Whether these functions are performed in hardware or software depends on the particular application and design constraints of the technical solution. The skilled person may use different methods to implement the described functions for each particular application, but such implementation should not be considered as going beyond the scope of the present invention.

What is claimed is:

1. A field programmable gate array (FPGA) dynamic reconfiguration method, comprising:
    performing board support package (BSP) flat compilation on a target project to obtain a static region on an FPGA chip corresponding to the target project;
    performing BSP generation and reconfiguration information compilation on the target project to obtain static information;
    revising the static region using the static information to obtain reconfiguration compilation version projects that meet timing and correspond to different reconfiguration compilation parameters, respectively;
    importing a preset heterogeneous acceleration kernel into the reconfiguration compilation version projects and then performing static compilation to obtain clock frequencies corresponding to the reconfiguration compilation version projects respectively; and
    determining a target reconfiguration compilation version project with a clock frequency that meets performance requirements using the clock frequencies, and obtaining a dynamic reconfiguration compilation version project file using the target reconfiguration compilation version project.

2. The FPGA dynamic reconfiguration method according to claim 1, wherein the performing BSP flat compilation on a target project to obtain a static region on an FPGA chip corresponding to the target project comprises:
    performing BSP flat compilation on the target project under different flat compilation parameters to obtain spatial position information of layout and routing of interface Intellectual Property (IP) corresponding to the different flat compilation parameters respectively on the FPGA chip; and
    determining the static region using the spatial position information according to static region division rules.

3. The FPGA dynamic reconfiguration method according to claim 1, wherein the performing BSP generation and reconfiguration information compilation on the target project to obtain static information comprises:
    performing BSP generation and reconfiguration information compilation on the target project under the different reconfiguration compilation parameters to obtain original reconfiguration compilation version projects corresponding to the different reconfiguration compilation parameters respectively; and
    acquiring a critical path from the original reconfiguration compilation version projects, and using the critical path as the static information.

4. The FPGA dynamic reconfiguration method according to claim 3, wherein the revising the static region using the static information to obtain reconfiguration compilation version projects that meet timing and correspond to different reconfiguration compilation parameters, respectively comprises:
    correcting timing violations corresponding to the original reconfiguration compilation version projects and revising the static region using critical information to obtain the reconfiguration compilation version projects.

5. The FPGA dynamic reconfiguration method according to claim 1, wherein the importing a preset heterogeneous acceleration kernel into the reconfiguration compilation version projects and then performing static compilation to obtain clock frequencies corresponding to the reconfiguration compilation version projects respectively comprises:
    sequentially importing the preset heterogeneous acceleration kernel into each of the reconfiguration compilation version projects and then performing static compilation to obtain the clock frequencies corresponding to each of the reconfiguration compilation version projects, respectively, after being imported with different preset heterogeneous acceleration kernels.

6. The FPGA dynamic reconfiguration method according to claim 5, wherein the determining a target reconfiguration compilation version project with a clock frequency that meets performance requirements using the clock frequencies, and obtaining a dynamic reconfiguration compilation version project file using the target reconfiguration compilation version project comprises:
    calculating, using the clock frequencies, average clock frequencies corresponding to each of the reconfiguration compilation version projects after being imported with the different preset heterogeneous acceleration kernels;
    determining a reconfiguration compilation version project corresponding to a maximum average clock frequency as the target reconfiguration compilation version project; and
    acquiring the dynamic reconfiguration compilation version project file generated by the target reconfiguration compilation version project corresponding to the maximum average clock frequency.

7. The FPGA dynamic reconfiguration method according to claim 1, wherein after the obtaining a dynamic reconfiguration compilation version project file using the target reconfiguration compilation version project, the method comprises:
    dynamically reconfiguring the preset heterogeneous acceleration kernel in the FPGA chip on the basis of the dynamic reconfiguration compilation version project file.

8. A field programmable gate array (FPGA) dynamic reconfiguration device, comprising:
    a memory configured to store a computer program; and
    a processor configured to implement, when executing the computer program, the steps of a FPGA dynamic reconfiguration method, wherein the FPGA dynamic reconfiguration method comprises:
    performing board support package (BSP) flat compilation on a target project to obtain a static region on an FPGA chip corresponding to the target project;
    performing BSP generation and reconfiguration information compilation on the target project to obtain static information;
    revising the static region using the static information to obtain reconfiguration compilation version projects that meet timing and correspond to different reconfiguration compilation parameters, respectively;

importing a preset heterogeneous acceleration kernel into the reconfiguration compilation version projects and then performing static compilation to obtain clock frequencies corresponding to the reconfiguration compilation version projects respectively; and determining a target reconfiguration compilation version project with a clock frequency that meets performance requirements using the clock frequencies, and obtaining a dynamic reconfiguration compilation version project file using the target reconfiguration compilation version project.

9. The FPGA dynamic reconfiguration device according to claim 8, wherein the performing BSP flat compilation on a target project to obtain a static region on an FPGA chip corresponding to the target project comprises:

performing BSP flat compilation on the target project under different flat compilation parameters to obtain spatial position information of layout and routing of interface Intellectual Property (IP) corresponding to the different flat compilation parameters respectively on the FPGA chip; and determining the static region using the spatial position information according to static region division rules.

10. The FPGA dynamic reconfiguration device according to claim 8, wherein the performing BSP generation and reconfiguration information compilation on the target project to obtain static information comprises:

performing BSP generation and reconfiguration information compilation on the target project under the different reconfiguration compilation parameters to obtain original reconfiguration compilation version projects corresponding to the different reconfiguration compilation parameters respectively; and acquiring a critical path from the original reconfiguration compilation version projects, and using the critical path as the static information.

11. The FPGA dynamic reconfiguration device according to claim 10, wherein the revising the static region using the static information to obtain reconfiguration compilation version projects that meet timing and correspond to different reconfiguration compilation parameters, respectively comprises:

correcting timing violations corresponding to the original reconfiguration compilation version projects and revising the static region using critical information to obtain the reconfiguration compilation version projects.

12. The FPGA dynamic reconfiguration device according to claim 8, wherein the importing a preset heterogeneous acceleration kernel into the reconfiguration compilation version projects and then performing static compilation to obtain clock frequencies corresponding to the reconfiguration compilation version projects respectively comprises:

sequentially importing the preset heterogeneous acceleration kernel into each of the reconfiguration compilation version projects and then performing static compilation to obtain the clock frequencies corresponding to each of the reconfiguration compilation version projects, respectively, after being imported with different preset heterogeneous acceleration kernels.

13. The FPGA dynamic reconfiguration device according to claim 8, wherein the determining a target reconfiguration compilation version project with a clock frequency that meets performance requirements using the clock frequencies, and obtaining a dynamic reconfiguration compilation version project file using the target reconfiguration compilation version project comprises:

calculating, using the clock frequencies, average clock frequencies corresponding to each of the reconfiguration compilation version projects after being imported with the different preset heterogeneous acceleration kernels;

determining a reconfiguration compilation version project corresponding to a maximum average clock frequency as the target reconfiguration compilation version project; and acquiring the dynamic reconfiguration compilation version project file generated by the target reconfiguration compilation version project corresponding to the maximum average clock frequency.

14. The FPGA dynamic reconfiguration device according to claim 8, wherein after the obtaining a dynamic reconfiguration compilation version project file using the target reconfiguration compilation version project, the processor is further configured to:

dynamically reconfiguring the preset heterogeneous acceleration kernel in the FPGA chip on the basis of the dynamic reconfiguration compilation version project file.

15. A non-transitory readable storage medium, having stored thereon a computer program which, when executed by a processor, implements the steps of a FPGA dynamic reconfiguration method, wherein the FPGA dynamic reconfiguration method comprises:

performing board support package (BSP) flat compilation on a target project to obtain a static region on an FPGA chip corresponding to the target project;

performing BSP generation and reconfiguration information compilation on the target project to obtain static information;

revising the static region using the static information to obtain reconfiguration compilation version projects that meet timing and correspond to different reconfiguration compilation parameters, respectively;

importing a preset heterogeneous acceleration kernel into the reconfiguration compilation version projects and then performing static compilation to obtain clock frequencies corresponding to the reconfiguration compilation version projects respectively; and determining a target reconfiguration compilation version project with a clock frequency that meets performance requirements using the clock frequencies, and obtaining a dynamic reconfiguration compilation version project file using the target reconfiguration compilation version project.

16. The non-transitory readable storage medium according to claim 15, wherein the performing BSP flat compilation on a target project to obtain a static region on an FPGA chip corresponding to the target project comprises:

performing BSP flat compilation on the target project under different flat compilation parameters to obtain spatial position information of layout and routing of interface Intellectual Property (IP) corresponding to the different flat compilation parameters respectively on the FPGA chip; and determining the static region using the spatial position information according to static region division rules.

17. The non-transitory readable storage medium according to claim 15, wherein the performing BSP generation and reconfiguration information compilation on the target project to obtain static information comprises:

performing BSP generation and reconfiguration information compilation on the target project under the different reconfiguration compilation parameters to obtain original reconfiguration compilation version projects corresponding to the different reconfiguration compilation parameters respectively; and acquiring a critical path from the original reconfiguration compilation version projects, and using the critical path as the static information.

18. The non-transitory readable storage medium according to claim 17, wherein the revising the static region using the static information to obtain reconfiguration compilation version projects that meet timing and correspond to different reconfiguration compilation parameters, respectively comprises:

correcting timing violations corresponding to the original reconfiguration compilation version projects and revising the static region using critical information to obtain the reconfiguration compilation version projects.

19. The non-transitory readable storage medium according to claim 15, wherein the importing a preset heterogeneous acceleration kernel into the reconfiguration compilation version projects and then performing static compilation to obtain clock frequencies corresponding to the reconfiguration compilation version projects respectively comprises:

sequentially importing the preset heterogeneous acceleration kernel into each of the reconfiguration compilation version projects and then performing static compilation to obtain the clock frequencies corresponding to each of the reconfiguration compilation version projects, respectively, after being imported with different preset heterogeneous acceleration kernels.

* * * * *